(12) United States Patent
Stratton

(10) Patent No.: US 7,589,750 B1
(45) Date of Patent: Sep. 15, 2009

(54) METHODS AND APPARATUS FOR ARRANGING GRAPHICAL OBJECTS

(75) Inventor: Norman A. Stratton, Littleton, MA (US)

(73) Assignee: Adobe Systems, Inc., San Jose, CA (US)

( * ) Notice: Subject to any disclaimer, the term of this patent is extended or adjusted under 35 U.S.C. 154(b) by 574 days.

(21) Appl. No.: 11/376,354

(22) Filed: Mar. 15, 2006

(51) Int. Cl.
G09G 5/00 (2006.01)
G06T 11/20 (2006.01)
G06T 13/00 (2006.01)

(52) U.S. Cl. .................. 345/677; 345/440; 345/672; 345/619; 345/474

(58) Field of Classification Search .......... 345/619, 345/440, 473, 474, 672, 677; 715/853, 854
See application file for complete search history.

(56) References Cited

U.S. PATENT DOCUMENTS

| 6,732,114 | B1* | 5/2004 | Aamodt et al. | 707/102 |
| 6,901,555 | B2* | 5/2005 | Hida et al. | 715/853 |
| 7,253,823 | B2* | 8/2007 | Wong et al. | 345/440 |
| 7,315,985 | B1* | 1/2008 | Gauvin et al. | 715/853 |
| 2004/0133853 | A1* | 7/2004 | Poerner et al. | 345/854 |
| 2006/0066632 | A1* | 3/2006 | Wong et al. | 345/619 |
| 2008/0012859 | A1* | 1/2008 | Saillet et al. | 345/440 |

* cited by examiner

Primary Examiner—Chante Harrison
(74) Attorney, Agent, or Firm—Chapin IP Law, LLC

(57) ABSTRACT

Methods and apparatus for arranging and aligning graphical objects are disclosed. The selection of a first graphical object in a graphical user interface is received, and it is determined if the first graphical object is located at a substantially minimal distance in a reference plane from a related second graphical object on the graphical user interface. If the graphical objects are not located at a substantially minimal distance from each other in the reference plane, the graphical objects are graphically arranged to substantially minimize the distance in the reference plane between them.

31 Claims, 9 Drawing Sheets

METHODS AND APPARATUS FOR ARRANGING GRAPHICAL OBJECTS

BACKGROUND

Conventional computerized devices, such as personal computers, laptop computers, and the like utilize graphical user interfaces in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. For example, the user may select a graphical object by moving a mouse, so that a mouse pointer is on the desired graphical object on the graphical user interface, and then clicking a button on the mouse. The operating system treats the graphical object as being selected, and as long as the user continues to hold the button down, whenever the user moves the mouse, both the mouse pointer and the graphical object will correspondingly move across the graphical user interface, and this movement is visible on the display.

Using graphical user interface technology, users may create and edit documents and/or projects, such as navigation logic interconnecting different menus and video clips for a Digital Video Disk (DVD), by selecting and placing graphical objects (e.g., video clips, menus, sub-menus, etc.) into the project. DVD navigation logic results from interconnecting different video clips, menus, and submenus together in an organized hierarchy. Typically, this hierarchy is in the form of a tree structure, though any suitable type of organizational scheme may be used.

SUMMARY

Conventional technologies for showing graphical objects in a graphical user interface on a computer display, such as when creating navigation logic for DVDs, have limitations. In particular, the amount of space available on a computer display to show graphical objects on the graphical user interface is limited. As the number of graphical objects placed into a project increases, the computer display will not be able to show all of the graphical objects on the graphical user interface at the same time. When creating and editing navigation logic for a DVD, this creates frustrations for the user, who is unable to quickly and easily determine connections between related graphical objects, as not all the related graphical objects may be shown on the display. This problem increases exponentially as the total number of graphical objects, and the complexity of the interconnections between graphical objects, both increase. Thus, more time is often spent re-arranging the graphical objects on the graphical user interface, or scrolling the graphical user interface, so that relevant graphical objects are shown on the display, rather than creating and editing the navigation logic.

Embodiments disclosed below significantly overcome such problems by animating the movement of the graphical objects to place related graphical objects on the graphical user interface so that as many related graphical objects as possible are shown on the display in an aligned format to indicate to the user the relation of other objects to a selected object. A user may select any graphical object on the graphical user interface, and all graphical objects that are related to the selected graphical object are determined. If the graphical objects are organized in a hierarchy, such as a tree structure, the process begins with the root object in the hierarchy and continues to the end of the hierarchy. The selected graphical object remains in the same place on the graphical user interface (and thus on the display), as do any other objects in that section of the hierarchy. Offsets from the selected graphical object are calculated for each graphical object related to it, as well as for the non-related graphical objects that are in the same section of the hierarchy as a related graphical object. The related graphical objects, whatever their location in the hierarchy, are then moved each according to its calculated offset to align them as closely as possible with the selected graphical object. The other graphical objects in each respective section of the hierarchy are also moved according to their respective offsets. For example, if the hierarchy is a tree structure that expands from left to right, the various alignments create the effect of columns of graphical objects sliding up and down on the graphical user interface so that the vertical component of a vector connecting two related graphical objects is minimized. Of course, if a related graphical object is already located as closely as possible to another related graphical object, it is not moved as its calculated offset (and the offset for all other graphical objects in that section of the hierarchy) is zero.

Animation of the movement of the graphical objects uses the offsets calculated for each graphical object. After an offset is calculated for a graphical object, the amount of change in the object's position according to the calculated offset is stored in a list. When offsets have been calculated for each graphical object on the graphical user interface, the list contains a position delta (i.e., the amount of change in an object's position on the graphical user interface) for each graphical object. To achieve the animation effect, some portion of the position delta is applied to each graphical object on the graphical user interface as the graphical user interface is rendered on the display. This process is repeated until each graphical object on the graphical user interface has been moved its corresponding position delta. While the graphical objects are being rendered in different positions, the scroll position of the graphical user interface is adjusted accordingly so that the original selected graphical object remains in the same place on the display.

More particularly, the system receives a selection of a first graphical object in a graphical user interface. The first graphical object exist within a given level of a hierarchy of graphical objects that may be icons, for example. The system identifies one or more second graphical objects in at least one other level of the hierarchy of graphical objects that is different than the given level of the selected first graphical object, and that are related to the first graphical object and that are unaligned with the first graphical object. The system performs an alignment operation between the first graphical object and the second graphical object(s) to substantially align them relative to a reference plane defined between levels in the hierarchy of graphical objects. In one configuration, there may be a plurality of second graphical objects within other levels of the hierarchy of graphical objects that are unaligned with, but related to, the selected first graphical object. In such a case, the system aligns each of the other related and unaligned graphical objects within other levels of the hierarchy of graphical objects to be substantially aligned relative to the reference plane with the selected first graphical object. Since the related objects in hierarchy levels other than the level of the selected first object are moved, the system also adjusts a graphical position of these other objects within other levels of the hierarchy of graphical objects that contain a second graphical object related to the selected first graphical object. This adjusts all objects in each level in the hierarchy that contains a second graphical object related to the first graphical object relative to the second graphical object to align the second graphical object in that level with the reference plane relative to the selected first graphical object. In this manner, the user is presented with an alignment of related graphical objects that lie substantially along the same plane, thus allowing the user to quickly identify which objects in a hierarchy are related to one another in different levels of that hierarchy.

Another embodiment uses distance to align the objects and provides a method of arranging graphical objects. The method includes receiving a selection of a first graphical object in a graphical user interface; determining if the first graphical object is located at a substantially minimal distance in a reference plane from a related second graphical object on the graphical user interface; and if not, graphically arranging the first and the second graphical objects to substantially minimize the distance in the reference plane between the first and the second graphical objects.

In a related embodiment, the method may include identifying a set of pairs of related graphical objects that are related to the first graphical object, each pair of related graphical objects including a first and a second graphical object; and for each pair of related graphical objects, performing arrangement processing. Arrangement processing may include: determining if the first graphical object of a pair is located at a substantially minimal distance in a respective plane from the second graphical object of the pair on a graphical user interface; and if not, graphically arranging the first and the second graphical objects of the pair to substantially minimize the distance in the respective plane between the first and the second graphical objects of the pair. By minimizing the distance, the objects are inherently aligned in a plane.

In a further related embodiment, the graphical objects may be organized in a hierarchy that includes a root graphical object, and performing arrangement processing may include initially determining if the root graphical object is located at a substantially minimal distance in a respective plane from a graphical object related to the root graphical object. In yet a further related embodiment, performing arrangement processing may include: calculating an offset of one of the graphical objects of the pair from a respective plane of that pair; and moving that graphical object of the pair according to the offset to substantially minimize the distance in the respective plane between the first and the second graphical objects of the pair. In still another further related embodiment, graphically arranging the first and the second graphical objects of the pair may include: animating movement of at least one graphical object in each pair according to the offset to bring the graphical objects in each pair into substantial alignment with a respective plane of at least one of the graphical objects of that pair.

In another further related embodiment, the graphical objects may be organized in a hierarchy, the hierarchy including groupings of substantially aligned graphical objects, and wherein at least one grouping may include a respective graphical object that is part of a pair related to the first graphical object, and wherein graphically arranging may include: moving other graphical objects in a grouping relative to a movement of at least one graphical object within the grouping that is related to the selected first graphical object. In yet a further related embodiment, graphically arranging may include: animating movement of the graphical objects on the graphical user interface to provide a smooth transition of the graphical objects from an initial position to a final position on the graphical user interface. In yet another further related embodiment, animating may include applying an ease in, ease out algorithm to provide a smooth transition from the initial position to the final position on the graphical user interface.

In another related embodiment, graphical objects related to one another may be coupled via a link between an exit point of one graphical object and an entry point of another graphical object, and graphically arranging the first and the second graphical objects may include aligning an entry point of at least one of the first graphical object and the second graphical object with an exit point of the other of the first graphical object and the second graphical object, the alignment of the exit and entry point defining the reference plane between the first graphical object and the second graphical object.

In a further related embodiment, the first and the second graphical objects may be part of a set of graphical objects organized in a hierarchy, and the hierarchy may include groupings of substantially aligned graphical objects, including identifying a set of pairs of graphical objects related to one another, each pair including a graphical object from two distinct groupings and defining a respective reference plane between the groupings. In yet a further related embodiment, at least two reference planes may be in the same plane. In yet another further related embodiment, a sequence of reference planes, as defined by the set of pairs, may form a substantially common alignment plane for the hierarchy of graphical objects. In still yet another further related embodiment, the method may include at least one of rendering, in the graphical user interface, the links of each reference plane horizontally to form the hierarchy as a horizontal tree of graphical objects; and rendering, in the graphical user interface, the links of each reference plane vertically to form the hierarchy as a vertical tree of graphical objects.

In yet another related embodiment, each graphical object may represent a portion of information related to a video composition, and the portions of information may include: a menu; a video segment.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
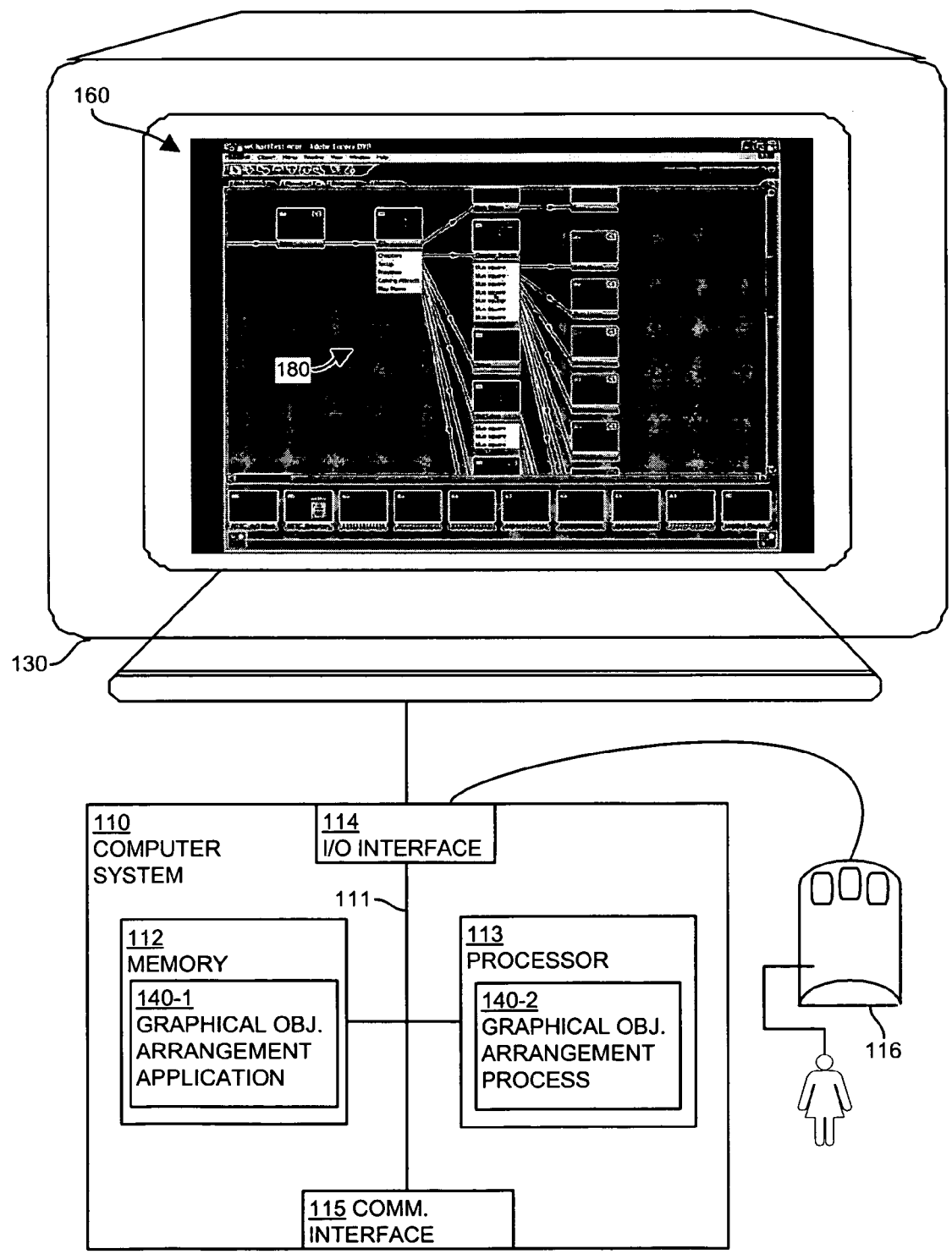
FIG. 1 shows a high-level block diagram of a computer system according to one embodiment disclosed herein.

Generally, disclosed embodiments include methods and apparatus for arranging graphical objects on a display so that related objects and their interconnections are easily identifiable. This configurations disclosed here are useful in scenarios, for example, where a hierarchy of objects are graphically displayed on a graphical user interface, such as in a tree or other form, and each level in the hierarchy has several graphical objects such as icons, and there may be many parent-child relationships between objects in adjacent levels of the hierarchy. The tree or other hierarchy may be arranged vertically or horizontally or in another manner. When initially graphically displayed on a graphical user interface, different levels in the hierarchy may be offset from other levels in the hierarchy such that related objects in one level (e.g. objects having a parent in a higher level, or a child in a lower level) that have a connection, pointer or link to a parent or child object or node (e.g. icon) in that other level are not initially aligned with each other. This situation can make it difficult for the viewer to quickly identify the path or relationship from an object of interest in the hierarchy either up or down in that hierarchy to other related objects in other levels of the hierarchy.

The system disclosed herein overcomes this issue by performing an automated and animated alignment process upon objects in various levels of the hierarchy that results in a visual end product that produces a graphical display in which objects in other levels of the hierarchy that are related to a selected object in the hierarchy are substantially aligned with each other relative to a reference plane defined generally by the selected object and extending up and/or down to other levels in the hierarchy of objects. This allows a user to quickly and easily see what other objects are related to (e.g. connected to, linked with, or are parents of, or children of) the selected object. Since the process is animated when changing from the initial unaligned graphical display to the aligned version of the display, the user is able to see where the formerly unaligned objects came from within the hierarchy as the alignment process is performed in an animated fashion. This provides a sense of dimension to the hierarchy as objects in other levels are graphically automatically maneuvered in animated fashion on the display to result in the aligned version of objects. In one configuration, the selected object and other objects in its level appear to be stationary, while all other levels in the hierarchy that have objects related to the selected object are adjusted in an animated manner to align those related objects in a substantially linear manner. The objects can be icons, for example, that represent any type of entity, resource, or other thing. In one configuration, the system applied to icons that represent a layout or structure of a video being composed, with different icons representing different menus and video clips or chapters of a DVD movie, for example. The system is no limited to such representations however and is generally applicable to any objects arranged in different levels or groups, where some objects in one group relate to other objects in another group.

In one configuration, the groups of objects happen to represent levels of hierarchically arranged objects and the first graphical object and the second graphical object are part of a collection of graphical objects in the hierarchy that represent portions of information related to a video composition, such as the structural parts of a DVD composition. The portions of information are ordered to represent navigation of the video composition, such as a root menu, title menu, chapter menus, and respective video segments for each chapter and so forth. The graphical objects thus represent portions of information that include menus and video segments of the video composition. The system is able to graphically arrange and align the graphical objects of the collection of graphical objects that are related to a selected object along a substantially common alignment plane to graphically indicate to a viewer of the graphical user interface a linear navigation path through the video composition that includes navigation through the selected object. Thus if a user selects an object representing a particular chapter video segment, the system can align all objects from the root menu along the navigation path a DVD viewer would have to navigate through all menus, sub-menus, and the like to arrive at the particular video segment for that chapter. This allows the user to quickly see what parts of the video composition create the path to the selected part.

FIG. 1 is a block diagram illustrating example architecture of a computer system 110 that executes, runs, interprets, operates or otherwise performs a graphical object arrangement application 140-1 and a graphical object arrangement process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as an author of DVD navigation logic to provide input commands and generally control the graphical user interface 160 that the graphical object arrangement application 140-1 and the graphical object arrangement process 140-2 provide on a display 130. The communications interface 115 enables the computer system 110 to communicate with other devices (e.g., other computers) on a network (not shown in FIG. 1).

The memory system 112 is any type of computer readable medium and in this example is encoded with an graphical object arrangement application 140-1 that includes graphical object arrangement process 140-2 that supports generation, display, and implementation of functional operations of the graphical user interface 160 as explained herein. The graphical object arrangement application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the graphical object arrangement application 140-1. Execution of the graphical object arrangement application 140-1 in this manner produces processing functionality in a graphical object arrangement process 140-2. In other words, the graphical object arrangement process 140-2 represents one or more portions or runtime instances of the graphical object arrangement application 140-1 performing or executing within or upon the processor 113 in the computer system 110 at runtime.

Generally, while operating the computer system 110, the user 108 manipulates at least one input device 116, such as a computer mouse. Through the manipulation of the at least one input device 116, the user 108 selects a graphical object 180 on the graphical user interface 160, which is shown on the display 130. For example, the user 108 might engage the graphical object arrangement application 140-1 by selecting the graphical object 180 on the graphical user interface 160. The graphical object arrangement process 140-2 then receives signals indicating an identity of the selected graphical object 180 and operates as explained below to arrange and align the graphical objects on the graphical user interface 160 on the display 130.

In one embodiment, the graphical object arrangement process 140-2 arranges graphical objects on the graphical user interface 160 so that graphical objects 180 related to the selected graphical object 180, and the interconnections between them, are shown by the display 130. In this embodiment, the user 108 is able to clearly and easily see the interconnections between related elements of a DVD navigation logic path. With each selection of a graphical object by a user 108 through an input device 116, the graphical object arrangement process 140-2 moves the graphical objects on the graphical user interface 160 so that as many graphical objects related to the selected graphical object are shown by the display 130.

It is noted that example configurations disclosed herein include the graphical object arrangement application 140-1 itself including the graphical object arrangement process 140-2 (i.e., in the form of un-executed or non-performing logic instructions and/or data). The graphical object arrangement application 140-1 may be stored on a computer readable medium (such as a floppy disk), hard disk, electronic, magnetic, optical or other computer readable medium. The graphical object arrangement application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the graphical object arrangement application 140-1 in the processor 113 as the graphical object arrangement process 140-2. Those skilled in the art will understand that the computer system 110 may include other processes and/or software and hardware components, such as an operating system not shown in this example.

The display 130 need not be coupled directly to computer system 110. For example, the graphical object arrangement application 140-1 may be executed on a remotely accessible computerized device via the network interface 115. In this instance, the graphical user interface 160 may be displayed locally to a user of the remote computer and execution of the processing herein may be client-server based.

Figure 2A:
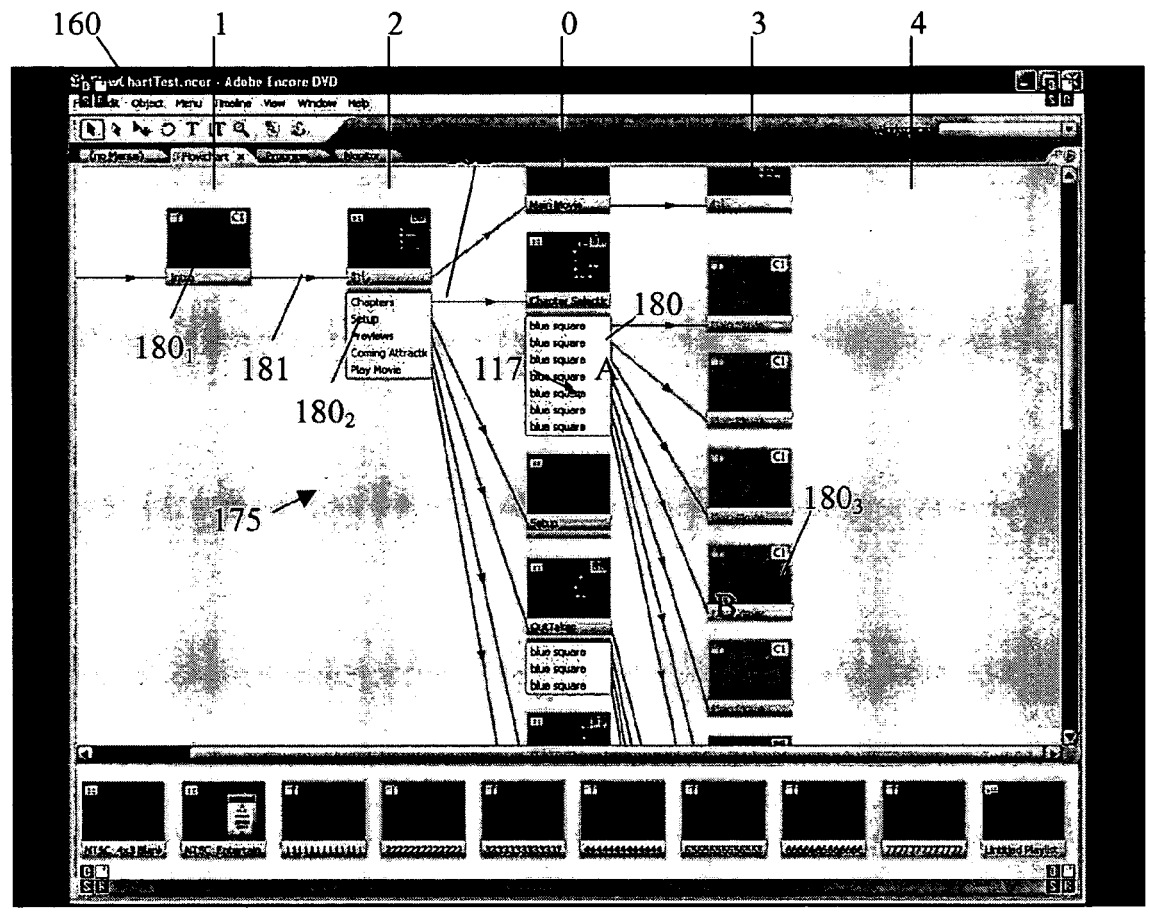
FIGS. 2A and 2B show respective before and after screenshots of the graphical user interface operating the graphical object arrangement process according to one embodiment disclosed herein.
Figure 2B:
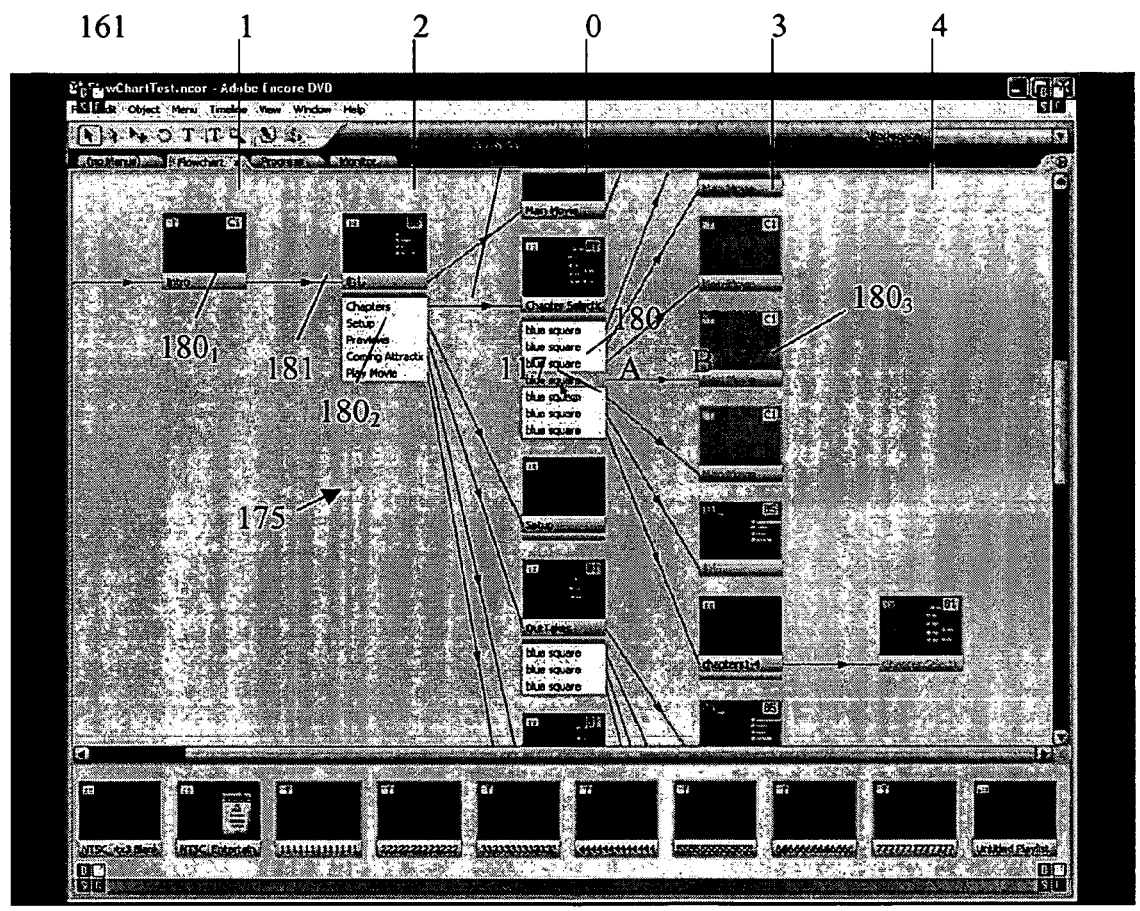
Figure 3:
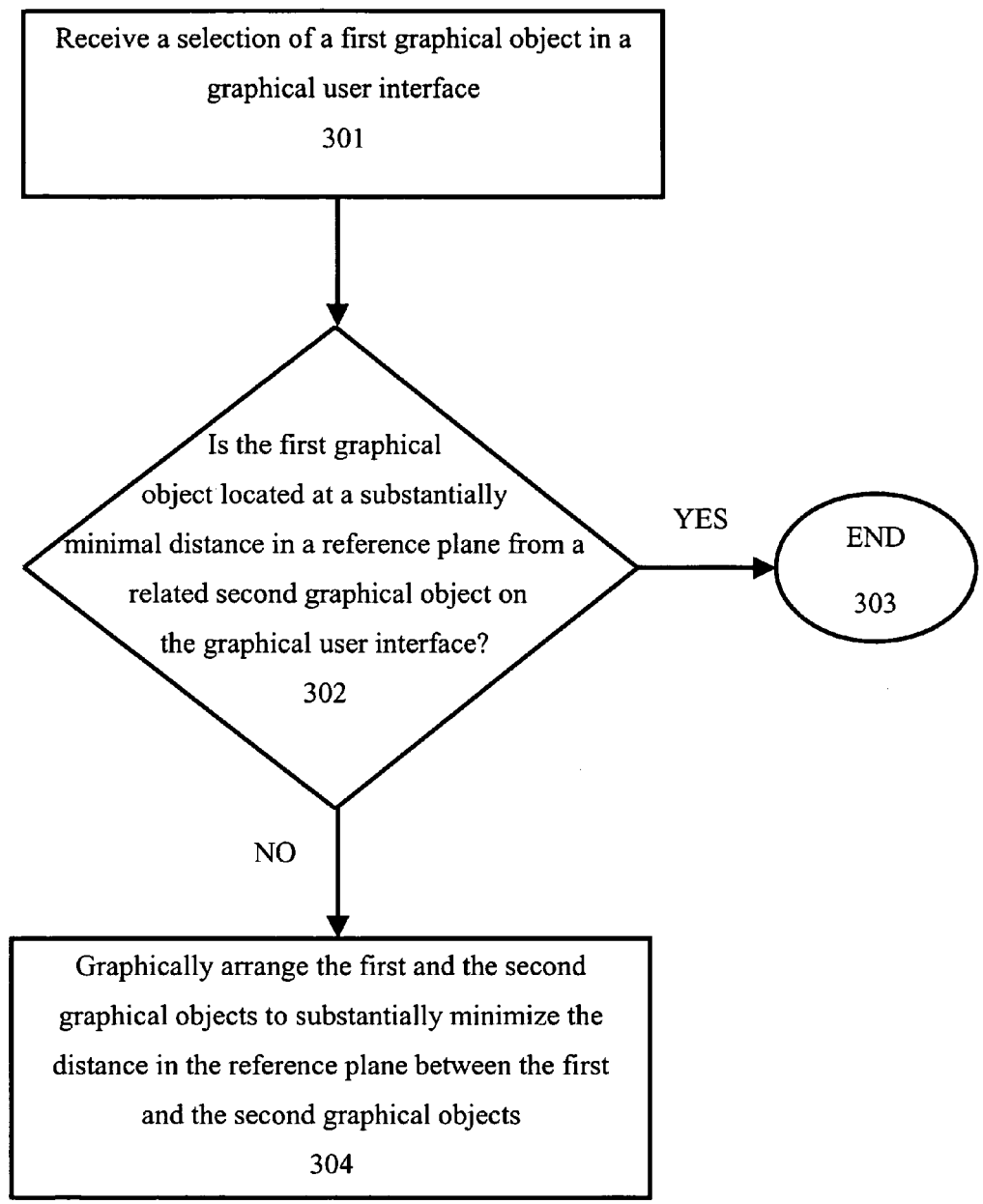
FIG. 3 illustrates a flowchart of a procedure performed by the system of FIG. 1 when the graphical object arrangement process moves two related graphical objects to minimize the distance between the objects in a reference plane, according to one embodiment disclosed herein.
Figure 4A:
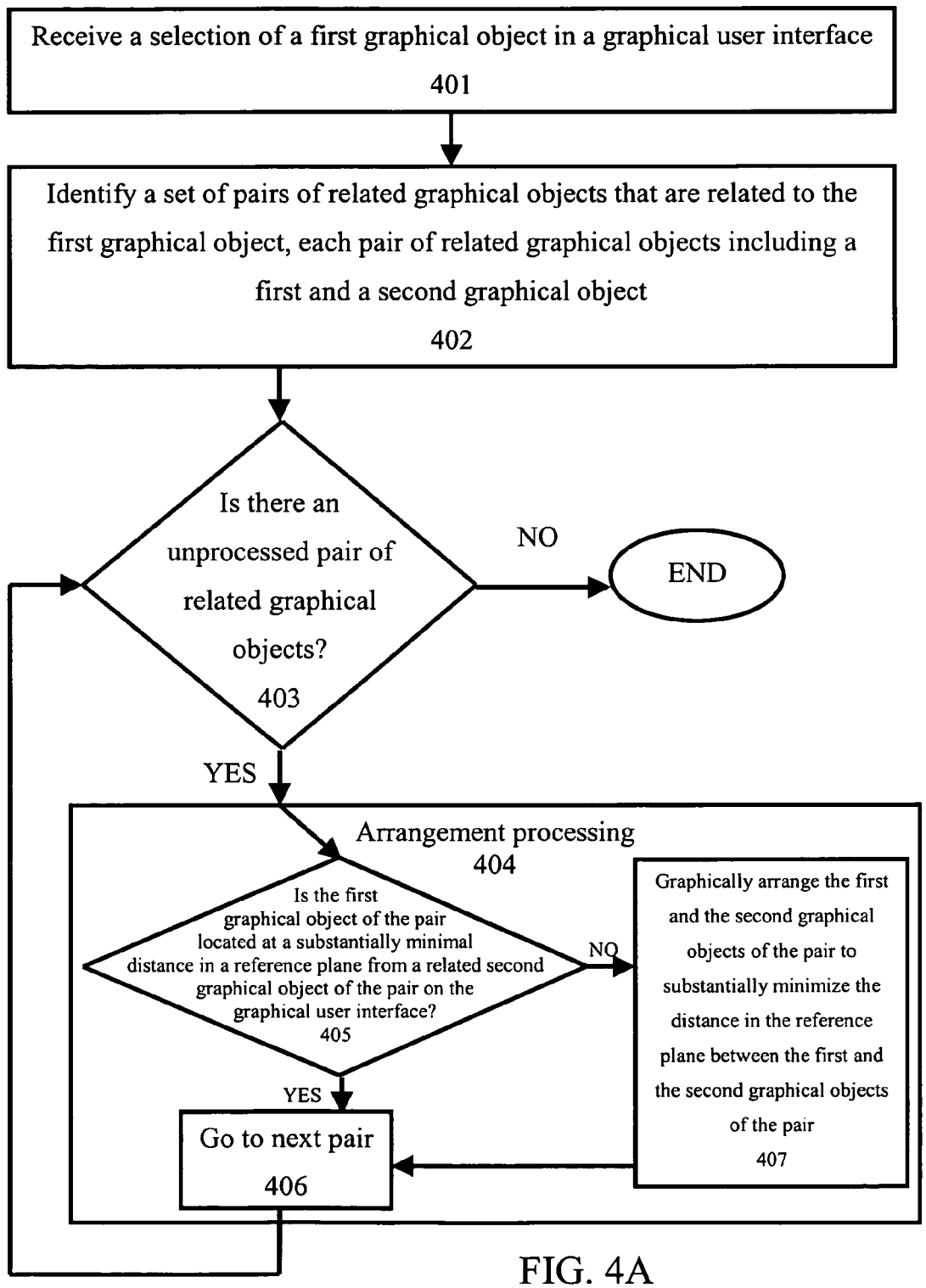
FIGS. 4A and 4B illustrate flowcharts of a procedure performed by the system of FIG. 1 when the graphical object arrangement process moves a plurality of graphical objects to minimize the distance between related objects in a number of reference planes, according to one embodiment disclosed herein.
Figure 4B:
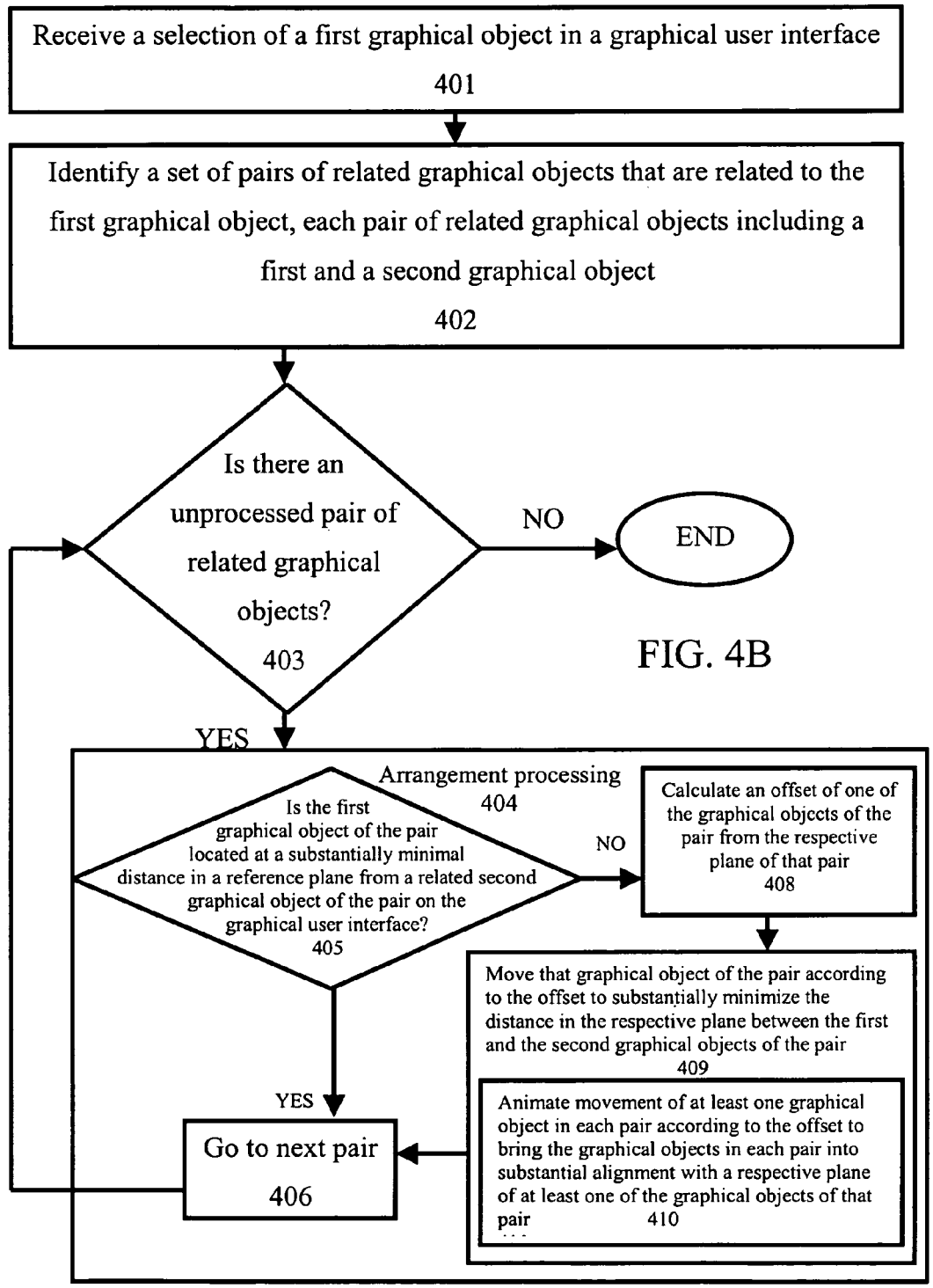
Figure 5:
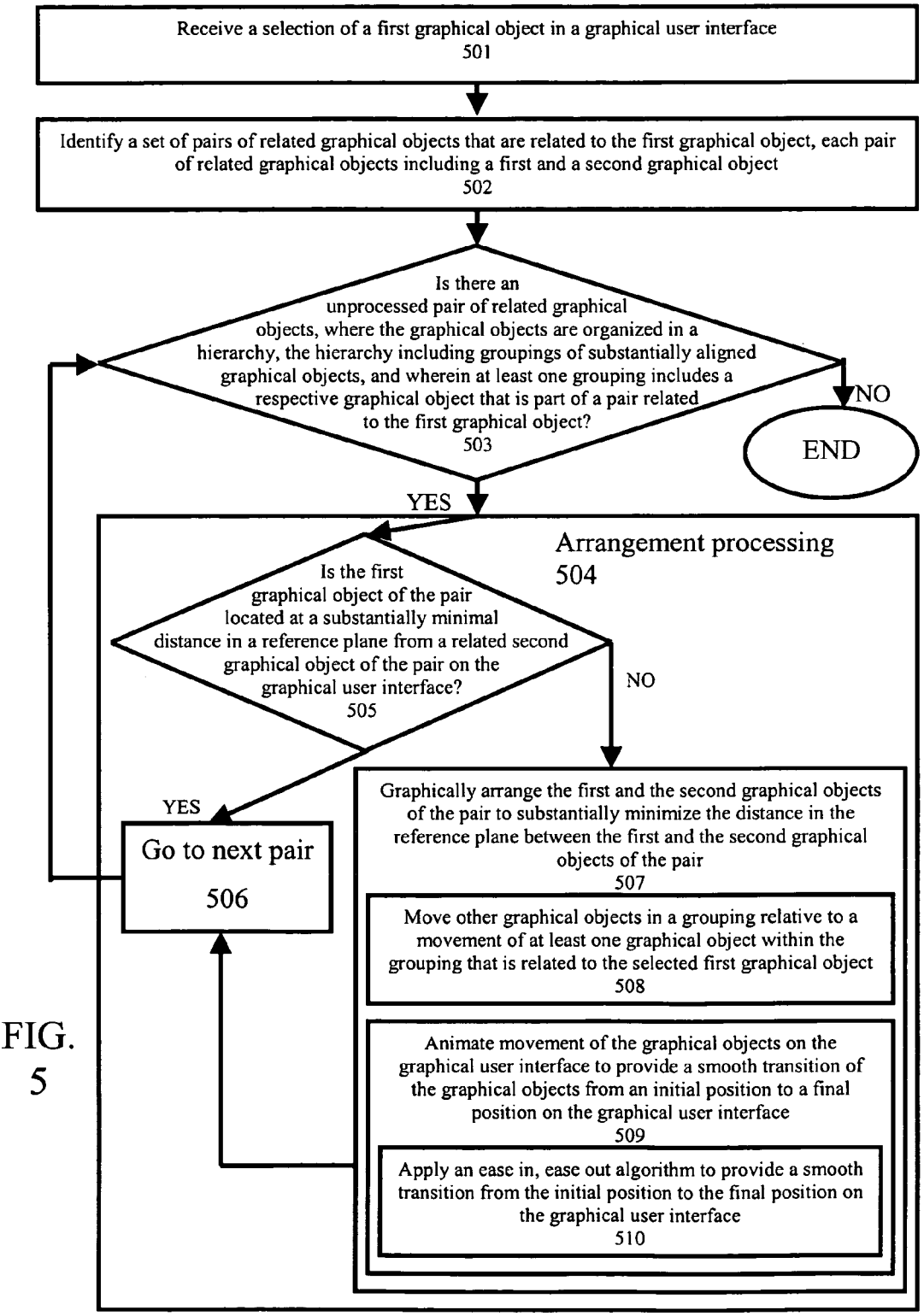
FIG. 5 illustrates a flowchart of a procedure performed by the system of FIG. 1 when the graphical object arrangement process moves a plurality of graphical objects and the groupings containing those graphical objects, to minimize the distance between related objects in a number of reference planes, according to one embodiment disclosed herein.

Embodiments below disclose animating the movement of the graphical objects 180 to place related graphical objects on the graphical user interface 160 so that as many related graphical objects are aligned on a common plane on the display. FIG. 2A (and the graphical user interface 160 in FIG. 1) show an example screenshot of the graphical user interface 160 as shown by the display 130 before the graphical object arrangement process is executed. FIG. 2B is an example screenshot of the graphical user interface 160 as shown by the display 130 after the graphical object arrangement process is executed. FIGS. 3-5 are flowcharts of various embodiments of the graphical object arrangement process.

The graphical user interface 160 contains graphical objects organized in a hierarchy of a horizontal tree structure 175. The graphical objects may be, for example but are not limited to, menus and segments of video that comprise DVD navigation logic created by using a DVD navigation logic authoring application. The DVD navigation logic authoring application is able to create navigation logic for any format of a DVD, including but not limited to HD-DVD and Blu-Ray as well as a standard-format DVD. In one embodiment, the organization of the hierarchy is stored in a list of data structures, with each data structure representing a different level of the hierarchy. Each data structure stores a list of elements that correspond to the graphical objects in that level of the hierarchy. Each element maintains a pointer to either no element or to one element in the data structure corresponding to the next level of the hierarchy. Each element, except for the element representing the root of the hierarchy, also maintains a pointer to the element in the data structure that represents the previous level of the hierarchy that points to it.

A user (not shown) who may be, for example, an author of DVD navigation logic, may select any graphical object on the graphical user interface 160 by manipulating an input device (represented on the graphical user interface by a pointer 117). The user selects a graphical object 180 from the graphical objects in the horizontal tree structure 175. The selected graphical object 180 may be, but is not limited to, a menu, as shown in FIGS. 2A and 2B. The selection of the graphical object 180 activates the graphical object arrangement process 140-2, which operates at a high-level as shown in the flowcharts of FIGS. 3-5.

The graphical object arrangement process 140-2 receives the selection of the graphical object 180, step 301/step 401/step 501. The initial selection of a graphical object determines, in one configuration, how the graphical object arrangement process 140-2 arranges the graphical objects on the graphical user interface 160, as is described in further detail below. The location on the selected graphical object 180 where the selection is made may itself influence the operation of the graphical object arrangement process 140-2. As shown in FIG. 2A, the location on the selected graphical object 180 is a particular menu item (labeled at location "A" in the figure) in the menu that the graphical object 180 represents. If the user had selected a different menu item, the graphical object arrangement process 140-2 may arrange the graphical objects on the graphical user interface 160 differently.

The graphical object arrangement process 140-2 then determines those graphical objects that are related to the selected graphical object (object 180 selected at location A). In the simplest situation, the graphical object arrangement process 140-2 may determine only a single related graphical object. When there are a plurality of graphical objects that are related to the selected graphical object, the graphical object arrangement process 140-2 identifies the graphical objects $180_1, 180_2, 180_3 \ldots 180_N$ that are related to the selected graphical object 180, step 402/502. These related graphical objects 180, 180₁, 180₂, 180₃ ... 180ₙ may be organized into a set of pairs of related graphical objects, step 402/step 502. Each pair in the set of pairs of related graphical objects includes two distinct related graphical objects. The related graphical objects in a pair may be, but are not limited to being, in consecutive levels of the hierarchy. Thus, in the screenshots shown in FIGS. 2A-2B, the set of pairs of related graphical objects is [(180₁, 180₋₂)(180-1,180-2, etc.), (180₂, 180), (180, 180₃)]. To determine those graphical objects that are related to the selected graphical object (object 180, but in this example selected specifically at menu item A), the graphical object arrangement process 140-2 accesses stored data structures (i.e. in memory 112) and their elements and follows pointers from the element representing the selected graphical object through the hierarchy in all possible directions until finding no further pointers in previous and successive data structures, which indicate both the root of the hierarchy and the end of the hierarchy, respectively. In the example as shown in FIGS. 2A-2B, the graphical object arrangement process 140-2 will identify all graphical objects related to the selected graphical object 180 both to the right, to the root of the horizontal tree structure 175, and to the left, to the end of the horizontal tree structure 175.

The graphical object arrangement process 140-2, for each respective pair of related graphical objects in the set of pairs, step 403/503, performs arrangement processing, step 404/504. In the simplest situation shown in FIG. 3, where there is only one pair that contains only two related graphical objects, the graphical object arrangement process 140-2 will process only the single pair. Arrangement processing may process the pairs of graphical objects in any desired order. When the graphical objects are organized in a hierarchy, such as the horizontal tree structure 175, arrangement processing can proceed according to the structure of that hierarchy. In one embodiment, the hierarchy includes a root graphical object, and arrangement processing occurs initially for the pair that contains the root graphical object. Arrangement processing will repeat for each pair in the set of pairs until all pairs in the set have been processed by the graphical object arrangement process 140-2.

In one configuration, arrangement processing comprises two steps. First, the graphical object arrangement process 140-2 determines if one of the graphical objects in the pair is located at a substantially minimal distance in a reference plane from the other related graphical object in the pair on the graphical user interface, step 405/505. When there is only a single pair, the graphical object arrangement process 140-2 determines if the selected graphical object is located at a substantially minimal distance in a reference plane from the related graphical object on the graphical user interface, step 302. The reference plane may be, for example, but is not limited to, a two-dimensional plane including both graphical objects. In such a plane, a straight horizontal line that connects the two related graphical objects may represent the substantially minimal distance between the two graphical objects. In the horizontal tree structure hierarchy 175 shown in FIGS. 2A-2B, the levels of the tree structure are predefined at fixed distances from each other, and the reference plane is defined in the graphical object arrangement process 140-2 as being a two-dimensional plane containing two graphical objects of a pair. Thus, two related graphical objects on the graphical user interface 160 are located at a substantially minimal distance in the reference plane if they are separated by a straight horizontal line. The related graphical objects 180₁ and 180₂, for example, which form a pair of related graphical objects, are already located at a substantially minimal distance from each other in the reference plane as they are separated by a straight horizontal line 181. Similarly, the related graphical objects 180₂ and 180, which also form a pair of related graphical objects, are also already located at a substantially minimal distance from each other in the reference plane, as they too are separated by a straight horizontal line 182. In one configuration, an initial plane is determine by the selected portion of a graphical object 180. As an example, in FIG. 2A, the graphical object 180 is selected at the location of menu choice A, and this location of selection on the graphical user interface 160 defines a horizontal reference plane that extends to the right, since the menu choice A is related (via a link) to graphical object 180₃ at location "B" in FIG. 2A. The graphical object arrangement process 140-2 in this case (and as will be explained in detail) determines that points A and B on the graphical user interface 160 are not, in FIG. 2A, at a minimal distance from each other on the reference plane defined by selection location A, and thus performs the processing disclosed herein the realign graphical object 180₃ (as well as all other objects in the same hierarchy level as object 180₃) so that the location B is aligned with location A of object 180, on this horizontal reference plane.

If the graphical object arrangement process 140-2 determines that the two graphical objects are already located on the graphical user interface at a substantially minimal distance from each other in the reference plane, then neither graphical object is moved, step 303, and the next pair of related graphical objects is processed, step 406/step 506, if there is one. As shown in FIGS. 2A and 2B, the graphical object arrangement process 140-2 does not move graphical objects 180, 180₁, and 180₂ as they are each already at a substantially minimal distance from the related graphical object in their respective pair.

If the graphical object arrangement process 140-2 determines that the two graphical objects are not located on the graphical user interface at a substantially minimal distance from each other in the reference plane, then the graphical object arrangement process 140-2 graphically arranges the graphical objects to substantially minimize the distance in the reference plane between the graphical objects, step 304/step 407/step 507. One or both of the graphical objects may be moved by the graphical object arrangement process 140-2 to a different position on the graphical user interface to substantially minimize the distance in the reference plane between them. In one configuration, the graphical object arrangement process 140-2 will move the related graphical object while the selected graphical object remains in the same position on the graphical user interface. In one embodiment, the selected graphical object remains in the same location on the graphical user interface after the graphical object arrangement process 140-2 finishes, which may be achieved by adjusting the scroll position of the window containing the graphical user interface. Thus, as is seen in FIGS. 2A and 2B, the selected graphical object 180 is in the same location on the graphical user interface 160, and the scroll position of the window containing the graphical user interface 160 has been adjusted to achieve this effect.

To graphically arrange the graphical objects, the graphical object arrangement process 140-2 calculates an offset of one of the graphical objects of a respective plane of the pair, step 408. The respective plane of the pair may be defined as is disclosed below in reference to FIGS. 6 and 7. Then, the graphical object arrangement process 140-2 moves that graphical object of the pair according to its offset, to substantially minimize the distance in the respective plane between the first and the second graphical objects of the pair, step 409. In the screenshots of FIGS. 2A-2B, the related graphical object 180₃ is not located at a substantially minimal distance in the reference plane from the selected graphical object 180. The graphical object arrangement process 140-2 calculates the offset of the related graphical object $180_3$ from the respective plane, which is defined as a horizontal plane extending from the center of the selected graphical object 180.

In one embodiment, offsets are calculated for each related graphical object $180_1, 180_2, 180_3 \ldots 180_N$, as well as for the non-related graphical objects that are in the same level 1, 2, 3 . . . N of the hierarchy 175 as one of the related graphical objects $180_1, 180_2, 180_3 \ldots 180_N$. Each level of the hierarchy thus includes a related graphical object and may include at least one other non-related graphical object, and such a level may be referred to as a grouping of graphical objects. The related graphical objects $180_1, 180_2, 180_3 \ldots 180_N$, whatever their location in the hierarchy 175, are then moved, each according to its calculated offset, to align them as closely as possible with the selected graphical object 180, step 410. At the same time, the non-related graphical objects in each level are also moved according to the offset calculated for the related graphical object that is part of the same grouping, step 508. Thus, each grouping on the graphical user interface will move, except for the grouping containing the selected graphical object. The resulting graphical user interface 161 is shown in FIG. 2B, which is an example screenshot of the graphical user interface 161 as shown on the display 130 after the graphical object arrangement process 140-2 has executed. If seen in real-time, the transition from the graphical user interface 160 in FIG. 2A to the graphical user interface 161 in FIG. 2B would look like the columns 1, 2, 3 . . . N of graphical objects were sliding up and down on the graphical user interface so that the vertical component of a vector connecting two related graphical objects $180, 180_1, 180_2, 180_3 \ldots 180_N$ is minimized. As shown in FIG. 2B and described above, when a related graphical object such as the related graphical object $180_1$ is already located as closely as possible to another related graphical object $180_2$, it is not moved as its calculated offset is zero. The non-related graphical objects in the same grouping, if any, are also not moved, as their offset is also zero.

To accomplish the movement of graphical object, the graphical object arrangement process 140-2 may animate the movement of at least one graphical object in each pair, step 509, according to the offset, step 410, to bring the graphical objects in each pair into substantial alignment with a respective plane of at least one of the graphical objects of that pair. The transition from the graphical user interface 160 of FIG. 2A to the graphical user interface 161 of FIG. 2B is thus an animation of the movement of the graphical objects. The animation is achieved by using the offsets calculated for each graphical object. After an offset is calculated for a graphical object, the amount of change in the object's position according to the calculated offset is stored in a list. When offsets have been calculated for each graphical object on the graphical user interface 160, the list contains a position delta (i.e., the amount of change in an object's position on the graphical user interface 160) for each graphical object. As the graphical user interface 160 is continually redrawn on the display 130, at least some portion of the position delta is applied to each graphical object on the graphical user interface 160; the entire position delta may be applied. In one embodiment, a changing portion of the position delta is applied to each graphical object according to an 'ease in, ease out' animation algorithm. This provides a smooth transition of the graphical objects from an initial position to a final position on the graphical user interface. The graphical object arrangement process 140-2 continues applying some portion of the position deltas until each graphical object on the graphical user interface 160 has been moved its corresponding position delta, which results in the graphical user interface 161 of FIG. 2B. Note that the scroll position of the graphical user interface 161 has been adjusted from the scroll position of the graphical user interface 160, so that the selected graphical object 180 remains in the same place on the display 130.

Figure 6:
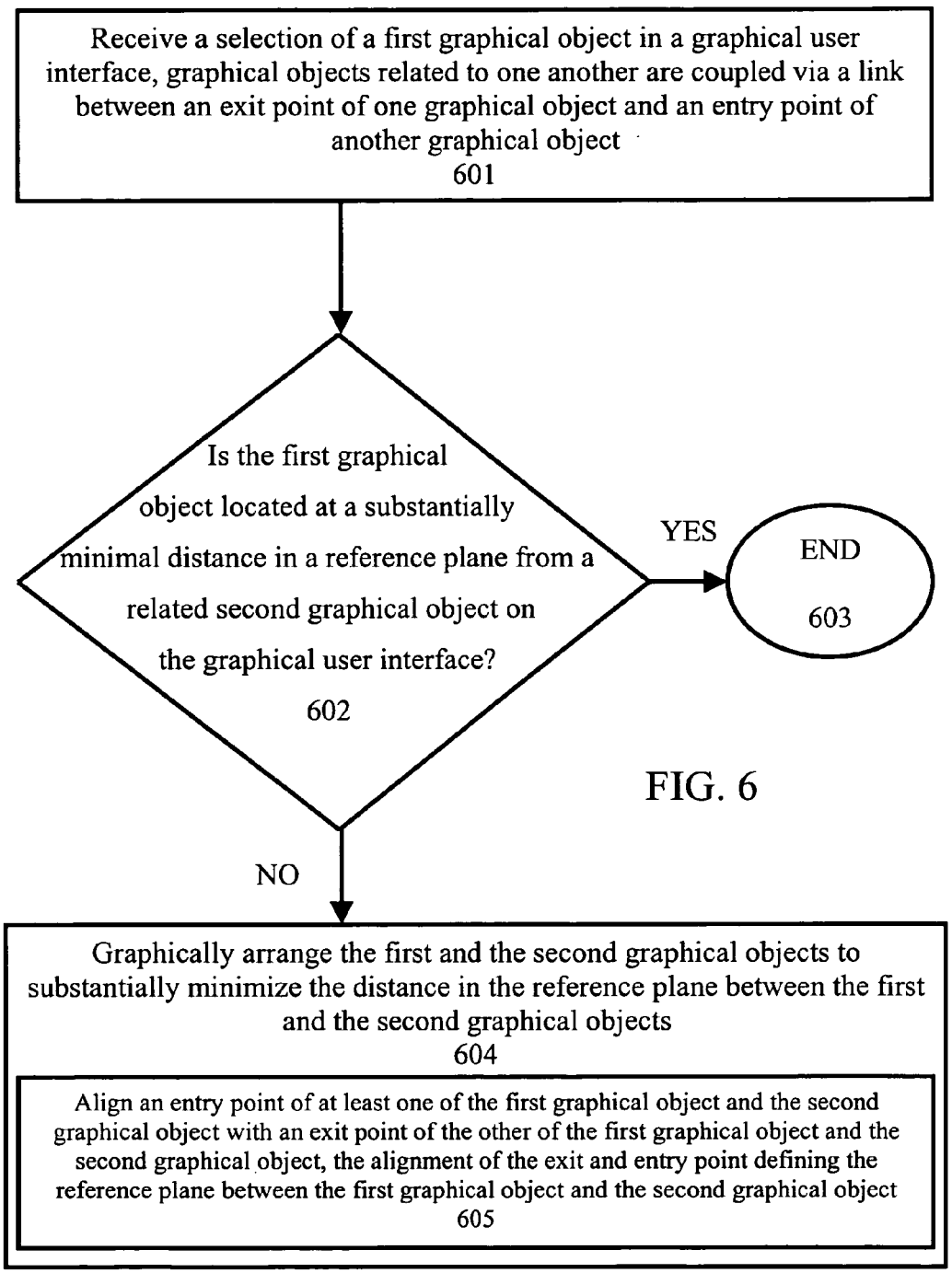
FIG. 6 illustrates a flowchart of a procedure performed by the system of FIG. 1 when the graphical object arrangement process graphically arranges two graphical objects by aligning entry points and exits points of the links coupling the two graphical objects, according to one embodiment disclosed herein.
Figure 7:
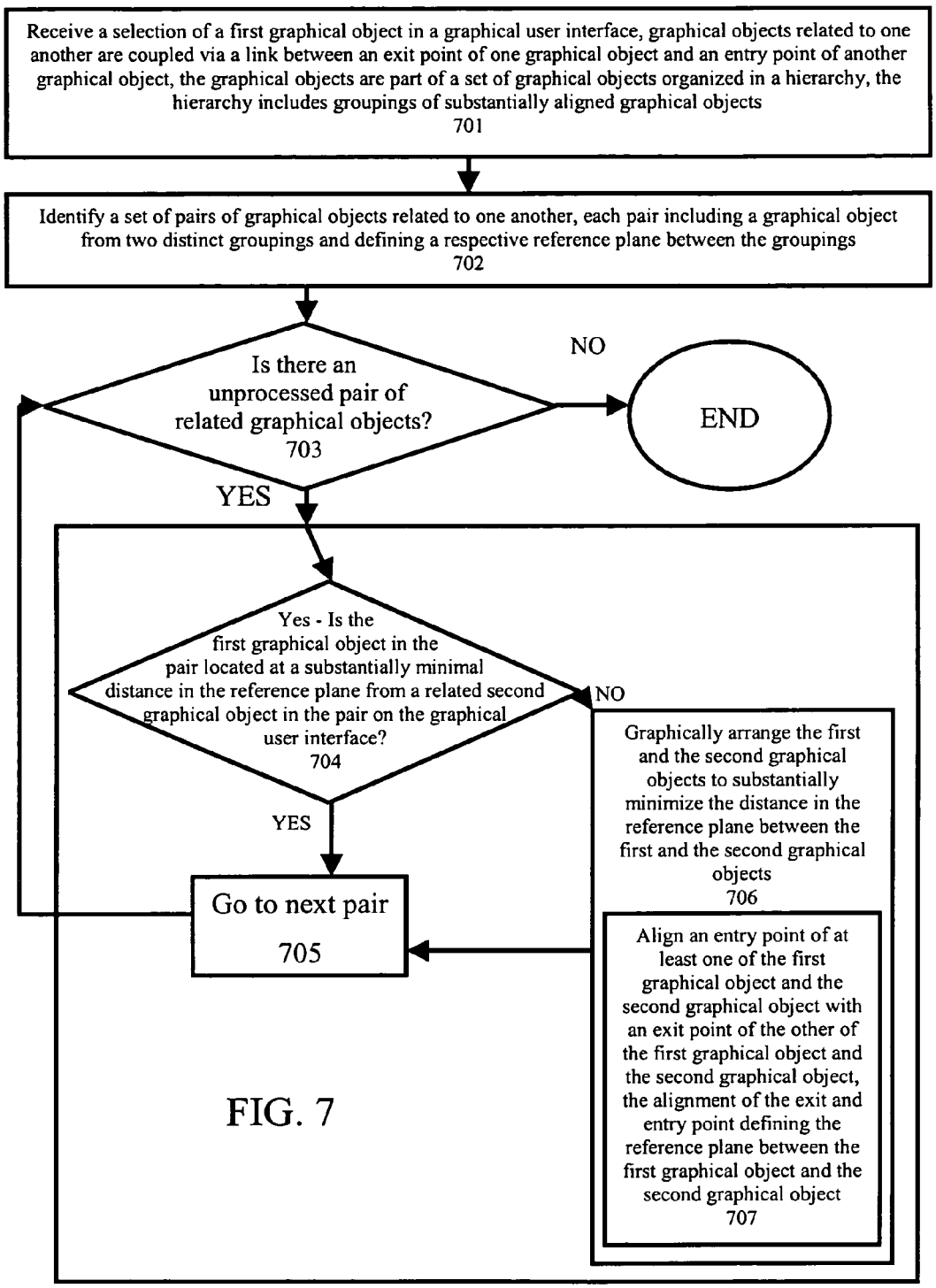
FIG. 7 illustrates a flowchart of a procedure performed by the system of FIG. 1 when the graphical object arrangement process graphically arranges a plurality of graphical objects, organized into groupings, by aligning entry points and exits points of the links coupling the plurality of graphical objects, according to one embodiment disclosed herein.

FIGS. 6 and 7 show flowcharts of steps performed by the graphical object arrangement process 140-2 to graphically arrange graphical objects that are related to each other and connected by links. The relation between the graphical objects is represented on the graphical user interface by a link connecting one graphical object with a related graphical object via entry and exit points. An entry point is the location on a graphical object where a link from another graphical object terminates. An exit point is the location on a graphical object where a link to another graphical object originates. Entry points and exit points may be located anywhere on a graphical object, and a single graphical object may have one or more entry points and one or more exits points. Any link between two graphical objects will extend from an exit point of one of the graphical objects to an entry point of the other. The graphical objects being aligned are part of a set of graphical objects that are organized into a hierarchy. The hierarchy includes groupings of substantially aligned graphical objects, and related graphical objects in the hierarchy are coupled by links.

The graphical object arrangement process 140-2 first receives a selection of a first graphical object in a graphical user interface that is coupled to a related graphical object by a link, step 601/step 701. The graphical object arrangement process 140-2 then identifies a set of pairs of graphical objects that are related to one another, with each pair including a graphical object from two distinct groupings and defining a respective reference plane between the groupings. While each respective reference plane may be located in a different plane, typically some of the defined reference planes will be located in the same plane. Further, a sequence of reference planes as defined by the set of pairs may form a substantially common alignment plane for the hierarchy of graphical objects, such that all related graphical objects are arranged according to this common alignment plane. The links of each reference plane may then be rendered in the graphical user interface in a particular direction to form the hierarchy of graphical objects on the graphical user interface. For example, the links may be rendered horizontally, forming the hierarchy as a horizontal tree of graphical objects, or the links may be rendered vertically, forming the hierarchy as a vertical tree of graphical objects.

After the graphical object arrangement process 140-2 identifies the set of pairs of related graphical objects, the graphical object arrangement process 140-2 will then loop through each pair in the set, step 703, until the graphical object arrangement process 140-2 processes each pair. First, the graphical object arrangement process 140-2 determines if the first graphical object in a pair is located at a substantially minimal distance in the defined reference plane from the related second graphical object in the pair, step 704. Of course, there may be only one pair of related graphical objects in the set, in which case the graphical object arrangement process 140-2 determines if the first graphical object is located at a substantially minimal distance in a reference plane from the related second graphical object on the graphical user interface, step 602.

If the two graphical objects are already located at a substantially minimal distance in the reference plane from each other, the graphical object arrangement process 140-2 proceeds to the next pair, if there is one, step 705. In the case where there is only one pair, and the two graphical objects in that pair are already located at a substantially minimal distance in the reference plane from each other, the graphical object arrangement process 140-2 ends, step 603.

If the two graphical objects are not already located at a substantially minimal distance in the reference plane from each other, the graphical object arrangement process 140-2 graphically arranges the graphical objects in the pair to substantially minimize the distance in the reference plane between the first and the second graphical objects, step 706, by aligning an entry point of one of the graphical objects with an exit point of the other of the graphical objects, step 604/step 707. The alignment of the exit point and the entry point defines the reference plane between the two graphical objects. The graphical arrangement process 140-2 then proceeds to the next pair, if there is one, and this loop repeats until the graphical arrangement process 140-2 processes all pairs in the set of pairs.

Applying the steps shown in FIGS. 6 and 7 to the screenshot of the GUI 160 shown in FIG. 2A results in the screenshot of the GUI 161 shown in FIG. 2B. As discussed above, the graphical objects are organized in a horizontal tree structure hierarchy 175. Each successive level of the tree is a grouping, and the graphical objects in each grouping are aligned in a column. The root of the tree structure is located at the far left of the hierarchy, and in this example, is the root graphical object. The root graphical object in this example represents the root menu of the DVD. The navigation logic interconnecting the graphical objects in this example are represented by arrows, where the head of an arrow is at a graphical object's entry point and the tail of an arrow is at a graphical object's exit point. Graphical objects may have more than one exit point but no graphical object in this example has more than one entry point. Entry and exit points are located on the vertical edges of the graphical objects, and the location varies depending on whether the graphical object represents a menu or a video segment.

As before, the GOAP receives a selection of a graphical object 180, and then determines all graphical objects $180_1$, $180_2$, and $180_3$ that are related to the selected graphical object 180. The GOAP then calculates offsets for each of the related graphical objects $180_1$, $180_2$, and $180_3$ and the non-related graphical objects in their respective groupings. The offsets for the related graphical objects $180_1$ and $180_2$ are each zero, as they are already located at a substantially minimal distance in the reference plane from each other and from the selected graphical object 180. The offset for the related graphical object $180_3$ is non-zero, and the GOAP then moves the related graphical object $180_3$ by aligning its entry point A with the exit point B of the link that connects the related graphical object $180_3$ with the selected graphical object 180.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method in which at least one computer system accesses instructions from computer storage and executes the instructions to perform steps of:
   receiving a selection of a first graphical object in a graphical user interface by the computer;
   determining if the first graphical object is located at a substantially minimal distance from a related second graphical object on the graphical user interface; and
   upon determining the first graphical object and the related second graphical object are located a distance greater than the minimal distance, graphically arranging the first and the second graphical objects to substantially reduce the distance between the first and the second graphical objects, wherein graphically arranging includes:
   while maintaining a current placement of the selected first graphical object in the graphical user interface, displaying an animated shift of the second graphical object by moving the second graphical object into alignment with the first graphical object in the graphical user interface.

2. The computer-implemented method of claim 1 further comprising:
   identifying a set of pairs of related graphical objects that are related to the first graphical object, each pair of related graphical objects including a first and a second graphical object; and
   for each pair of related graphical objects, performing arrangement processing including:
   determining if the first graphical object of a pair is located at a substantially minimal distance in a respective plane from the second graphical object of the pair on a graphical user interface; and
   if not, graphically arranging the first and the second graphical objects of the pair to substantially minimize the distance in the respective plane between the first and the second graphical objects of the pair.

3. The computer-implemented method of claim 2 wherein the graphical objects are organized in a hierarchy that includes a root graphical object; and
   wherein performing arrangement processing comprises:
   initially determining if the root graphical object is located at a substantially minimal distance in a respective plane from a graphical object related to the root graphical object.

4. The computer-implemented method of claim 3 wherein performing arrangement processing comprises:
   calculating an offset of one of the graphical objects of the pair from a respective plane of the pair; and
   moving that graphical object of the pair according to the offset to substantially minimize the distance in the respective plane between the first and the second graphical objects of the pair.

5. The computer-implemented method of claim 4 wherein moving that graphical object of the pair comprises:
   animating movement of at least one graphical object in each pair according to the offset to bring the graphical objects in each pair into substantial alignment with a respective plane of at least one of the graphical objects of that pair.

6. The computer-implemented method of claim 2 wherein the graphical objects are organized in a hierarchy, the hierarchy including groupings of substantially aligned graphical objects, and wherein at least one grouping includes a respective graphical object that is part of a pair related to the first graphical object; and
   wherein graphically arranging comprises:
   moving other graphical objects in a grouping relative to a movement of at least one graphical object within the grouping that is related to the selected first graphical object.

7. The computer-implemented method of claim 6 wherein graphically arranging comprises:
   animating movement of the graphical objects on the graphical user interface during alignment of the first and second graphical objects to provide a smooth animated transition of the graphical objects from an initial position to a final position on the graphical user interface.

8. The computer-implemented method of claim 1 wherein the first and the second graphical objects are part of a set of graphical objects organized in a hierarchy, and wherein the hierarchy includes groupings of substantially aligned graphical objects, and wherein the method comprises:
   identifying a set of pairs of graphical objects related to one another, each pair including a graphical object from two distinct groupings and defining a respective reference plane between the groupings.

9. The computer-implemented method of claim 8 wherein a sequence of reference planes, as defined by the set of pairs, forms a substantially common alignment plane for the hierarchy of graphical objects and wherein graphically arranging the first and the second graphical objects of the pair comprises:
   graphically aligning all objects in the hierarchy that are related to the selected first graphical object along the substantially common alignment plane.

10. The computer-implemented method of claim 9 comprising at least one of:
    rendering, in the graphical user interface, the links of each reference plane horizontally to form the hierarchy as a horizontal tree of graphical objects; and
    rendering, in the graphical user interface, the links of each reference plane vertically to form the hierarchy as a vertical tree of graphical objects.

11. The computer-implemented method as in claim 1, comprising:
providing a partial display of a hierarchy in the graphical user interface, the hierarchy comprising the first graphical object at a displayed portion of a first hierarchy level and the second graphical object at a displayed portion of a second hierarchy level, the second hierarchy level deeper than the first hierarchy level from a root node of the hierarchy;
wherein determining if the first graphical object is located at the substantially minimal distance includes determining if the first graphical object and the second graphical object are substantially aligned in the partial display of the hierarchy; and
wherein graphically arranging the first graphical object and the second graphical object results in substantial aligning of the second graphical object with the first graphical object.

12. The computer-implemented method as in claim 11, comprising:
wherein providing the partial display of the hierarchy includes displaying a link from the first graphical object to a third graphical object, the third graphical object belonging to a second portion of the second level located outside the partial display of the hierarchy; and
wherein displaying the animated shift results in moving the second portion of the second level into the partial display of the hierarchy to display the third graphical object in the graphical user interface.

13. The computer-implemented method as in claim 1, wherein maintaining the current placement of the selected first graphical object in the graphical user interface objects includes:
keeping the first graphical object stationary in the graphical user interface as the second graphical object shifts into alignment with the first graphical object in the graphical user interface.

14. The computer-implemented method as in claim 1, comprising:
displaying the first graphical object as being divided into a plurality of sections, the plurality of sections comprising at least a first section and a second section, the first section comprising a rendering of a representative screen shot, the second section comprising a selectable list of a plurality of navigation selections.

15. The computer-implemented method as in claim 14, comprising:
wherein displaying the first section includes displaying a rendering of a first portion of a video composition; and
wherein displaying the second section of the first graphical object includes representing multiple navigation paths emanating from the first graphical object by displaying a link from each navigation selection in the selectable list to a respective graphical object, each respective graphical object representing a particular portion of the video composition that can be accessed from the first portion of the video composition.

16. The computer-implemented method as in claim 14, wherein displaying the list in the second section of the first graphical object, includes:
displaying a link representing a navigation path between a first navigation selection in the selectable list and the second graphical object, the first navigation selection in the selectable list representing the second graphical object.

17. The computer-implemented method as in claim 16, comprising:
wherein receiving selection of the first graphical object includes detecting a user choosing the first navigation selection in the selectable list; and
during the animated shift, emphasizing the navigation path between the first navigation selection and the second graphical object by applying a highlighting effect to the first navigation selection in the selectable list.

18. The computer-implemented method as in claim 1 further comprising:
initiating display of the first graphical object as a given node in a first level of a hierarchical tree;
initiating display of the first graphical object to include multiple selectable entries, the multiple selectable entries including at least a first selectable entry and a second selectable entry, each of the multiple selectable entries representing a corresponding graphical object at a second level of the hierarchical tree beneath the first level;
the first selectable entry referencing the second graphical object, the second selectable entry referencing a third graphical object, both the second graphical object and third graphical object being in the second level of the hierarchical tree;
initiating display of at least the second graphical object and the third graphical object in a sequence of graphical objects in the second level of the hierarchical tree;
wherein receiving selection of the first graphical object includes receiving selection of the first selectable entry displayed in the given node at the first level of the hierarchical tree;
prior to receiving the selection, positioning the sequence of graphical objects so a distance between the second selectable entry and the third graphical object is smaller than a distance between the first selectable entry and the second graphical object; and
in response to receiving the selection, repositioning the sequence of graphical objects to decrease the distance between the first selectable entry and the second graphical object and increase the distance between the second selectable entry and the third graphical object.

19. The computer-implemented method as in claim 18, wherein repositioning the sequence of graphical objects includes shifting the sequence so that the distance between the second selectable entry and the third graphical object is greater than the distance between the first selectable entry and the second graphical object.

20. The computer-implemented method as in claim 18 further comprising:
displaying a first visual link radially outward from the given node to the second graphical object; and
displaying a second visual link radially outward from the given node to the third graphical object.

21. The computer-implemented method as in claim 18, wherein repositioning the sequence of graphical objects includes shifting the sequence so that the second graphical object in the second level of the hierarchical tree substantially aligns with the first selectable entry in the first graphical object.

22. A computer system comprising:
a memory;
a processor;
a display;
an interconnection mechanism coupling the memory, the processor and the display allowing communication therebetween;

wherein the memory is encoded with an arrangement application, that when executed in the processor, provides an arrangement process that arranges graphical objects in a graphical user interface by causing the computer system to perform the operations of:

receiving a selection of a first graphical object in the graphical user interface;

determining if the first graphical object is located at a substantially minimal distance in a reference plane from a related second graphical object on the graphical user interface; and upon determining the first graphical object and the related second graphical object are located a distance greater than the minimal distance, graphically arranging the first and the second graphical objects to substantially minimize the distance in the reference plane between the first and the second graphical objects, wherein graphically arranging includes:

while maintaining a current placement of the selected first graphical object in the graphical user interface, displaying an animated shift of the second graphical object by moving the second graphical object into alignment with the first graphical object in the graphical user interface.

23. A computer program product, stored on computer readable medium, to arrange graphical objects on a graphical user interface, comprising:

computer program code for receiving a selection of a first graphical object in a graphical user interface;

computer program code for determining if the first graphical object is located at a substantially minimal distance in a reference plane from a related second graphical object on the graphical user interface; and upon determining the first graphical object and the related second graphical object are located a distance greater than the minima distance, computer program code for graphically arranging the first and the second graphical objects to substantially minimize the distance in the reference plane between the first and the second graphical objects, wherein graphically arranging includes:

while maintaining a current placement of the selected first graphical object in the graphical user interface, displaying an animated shift of the second graphical object by moving the second graphical object into alignment with the first graphical object in the graphical user interface.

24. The computer program product of claim 23 further comprising:

computer program code for identifying a set of pairs of related graphical objects that are related to the first graphical object, each pair of related graphical objects including a first and a second graphical object; and for each pair of related graphical objects, computer program code for performing arrangement processing including:

computer program code for determining if the first graphical object of a pair is located at a substantially minimal distance in a respective plane from the second graphical object of the pair on a graphical user interface; and if not, computer program code for graphically arranging the first and the second graphical objects of the pair to substantially minimize the distance in the respective plane between the first and the second graphical objects of the pair.

25. The computer program product of claim 24 wherein the graphical objects in the graphical user interface are organized in a hierarchy, the hierarchy including groupings of substantially aligned graphical objects, and wherein at least one grouping includes a respective graphical object that is part of a pair related to the first graphical object, and wherein computer program code for graphically arranging comprises:

computer program code for moving other graphical objects in a grouping relative to a movement of at least one graphical object within the grouping that is related to the selected first graphical object.

26. The computer program product of claim 24 wherein computer program code for performing arrangement processing comprises:

computer program code for calculating an offset of one of the graphical objects of the pair from a respective plane of the pair; and computer program code for moving that graphical object of the pair according to the offset to substantially minimize the distance in the respective plane between the first and the second graphical objects of the pair.

27. The computer program product of claim 26 wherein computer program code for graphically arranging the first and the second graphical objects of the pair comprises:

computer program code for animating movement of at least one graphical object in each pair according to the offset to bring the graphical objects in each pair into substantial alignment with a respective plane of at least one of the graphical objects of that pair.

28. A computer-implemented method in which at least one computer system accesses instructions from computer storage and executes the instructions to perform steps of:

receiving a selection of a first graphical object in a graphical user interface by the computer, the first graphical object existing within a given level of a hierarchy of graphical objects;

identifying at least one second graphical object in at least one other level of the hierarchy of graphical objects that is different than the given level of the first graphical object, and that is related to the first graphical object, and that is unaligned with the first graphical object; and while maintaining a current placement of the selected first graphical object in the graphical user interface, performing an alignment operation between the first graphical object and the second graphical object to substantially align the first and second graphical objects relative to a reference plane defined between levels in the hierarchy of graphical objects.

29. The computer-implemented method of claim 28 wherein identifying at least one second graphical object in at least one other level of the hierarchy comprises:

identifying a plurality of second graphical objects within other levels of the hierarchy of graphical objects that are unaligned with the selected first graphical object; and wherein performing an alignment operation between the first graphical object and the second graphical object comprises:

aligning each of the plurality of second graphical objects within other levels of the hierarchy of graphical objects to be substantially aligned relative to the reference plane with the selected first graphical object.

30. The computer-implemented method of claim 29 wherein aligning each of the plurality of second graphical objects within other levels of the hierarchy of graphical objects to be substantially aligned relative to the reference plane with the selected first graphical object comprises:

adjusting a graphical position of other objects within other levels of the hierarchy of graphical objects that contain a second graphical object related to the selected first graphical object, so that all objects in each level in the hierarchy that contain a second graphical object related to the first graphical object are graphically adjusted to align the second graphical object in that level with the reference plane relative to the selected first graphical object.

31. The computer-implemented method of claim 28 wherein performing an alignment operation between the first graphical object and the second graphical object to substantially align the first and second graphical objects relative to a reference plane defined between levels in the hierarchy of graphical objects comprises:

minimizing a distance between a reference point of the first graphical object and a reference point of the second graphical object while maintaining each of the first and second graphical objects aligned within other graphical objects in their respective levels in the hierarchy.

* * * * *

UNITED STATES PATENT AND TRADEMARK OFFICE
CERTIFICATE OF CORRECTION

PATENT NO.       : 7,589,750 B1
APPLICATION NO. : 11/376354
DATED            : September 15, 2009
INVENTOR(S)      : Norman A. Stratton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Twenty-first Day of September, 2010

David J. Kappos
*Director of the United States Patent and Trademark Office*